(12) United States Patent
Littlefield et al.

(10) Patent No.: US 12,110,676 B2
(45) Date of Patent: Oct. 8, 2024

(54) STOWABLE POWER GENERATOR DEVICE

(71) Applicant: Woods Hole Oceanographic Institution, Woods Hole, MA (US)

(72) Inventors: Robin Littlefield, Falmouth, MA (US); Jeffrey Kaeli, Woods Hole, MA (US)

(73) Assignee: WOODS HOLE OCEANOGRAPHIC INSTITUTION, Woods Hole, MA (US)

( * ) Notice: Subject to any disclaimer, the term of this patent is extended or adjusted under 35 U.S.C. 154(b) by 241 days.

(21) Appl. No.: 17/734,183

(22) Filed: May 2, 2022

(65) Prior Publication Data

US 2022/0349172 A1    Nov. 3, 2022

Related U.S. Application Data

(60) Provisional application No. 63/183,248, filed on May 3, 2021.

(51) Int. Cl.

| | |
|---|---|
| *E04B 1/344* | (2006.01) |
| *B65D 85/68* | (2006.01) |
| *B65D 88/12* | (2006.01) |
| *F03D 13/20* | (2016.01) |
| *H02S 10/12* | (2014.01) |
| *H02S 30/20* | (2014.01) |

(52) U.S. Cl.
CPC .............. *E04B 1/344* (2013.01); *B65D 85/68* (2013.01); *B65D 88/121* (2013.01); *F03D 13/20* (2016.05); *H02S 10/12* (2014.12); *H02S 30/20* (2014.12); *F05B 2240/91* (2013.01)

(58) Field of Classification Search
CPC ......... E04B 1/344; B65D 85/68; F03D 13/20; F05B 2240/91; F05B 2240/211; F05B 2240/915

See application file for complete search history.

(56) References Cited

U.S. PATENT DOCUMENTS

| | | |
|---|---|---|
| 6,246,125 B1 | 6/2001 | Axtell |
| 6,979,170 B2 | 12/2005 | Dery et al. |
| 7,105,940 B2 | 9/2006 | Weesner et al. |
| 7,821,147 B2 | 10/2010 | Du Bois |
| 2011/0042958 A1 | 2/2011 | Vander Straeten |
| 2019/0061885 A1 | 2/2019 | Baro et al. |
| 2021/0222676 A1* | 7/2021 | Karasawa ............... F03D 13/40 |

* cited by examiner

*Primary Examiner* — Patrick J Maestri
(74) *Attorney, Agent, or Firm* — Douglas Denninger; Cristy Salanga

(57) ABSTRACT

A stowable generator device including a housing defining at least one storage chamber having an opening. A closure element is configured to selectively cover and uncover the opening. Support structure is disposed within the storage chamber in a collapsed position and is selectively extendable through the opening into an expanded position when the closure element is moved away from the opening. At least one energy generating unit is connected to the support structure. The support structure and the generating unit are configured to reversibly stow inside the housing in the collapsed position.

2 Claims, 3 Drawing Sheets

STOWABLE POWER GENERATOR DEVICE

CROSS-REFERENCE(S) TO RELATED APPLICATION(S)

This application claims priority to U.S. Provisional Application No. 63/183,248 filed 3 May 2021. The entire contents of the above-mentioned application are incorporated herein by reference.

STATEMENT REGARDING GOVERNMENT LICENSE RIGHTS

The invention described herein was made with U.S. government support under Award No. N00024-10-D-6318/ DO#N0002420F8712, UW Subaward No. UWSC12118 awarded by the Defense Advanced Research Projects Agency ("DARPA") of the U.S. Department of Defense. The U.S. Government has certain rights in the invention.

FIELD OF THE DISCLOSURE

This invention relates to stowable energy sources, particularly wind, hydroelectric, and solar energy collectors that may be stored within a protective housing and selectively deployed.

BACKGROUND

Wind, hydroelectric, and solar power are three promising renewable energy resources. They are abundant, inexhaustible, widely distributed, and clean. Because of these attributes, there continues to be intensive interest and research in harvesting these energy sources.

Wind turbines are currently utilized to generate electricity for various uses, including for homes and communities, businesses, and commercial production, as well as less traditional uses, for example ocean-going platforms and vessels. A common problem with these energy sources is that they are not present at all times, meaning a generator may be unused for a portion of time. When not being used, a common practice is for the generator to remain in the same configuration it is in while generating electricity.

Some generators have been described to have more than one configuration, for example, U.S. Pat. No. 6,979,170 describes an allegedly self-erecting vertical-axis windmill. However, the configuration is complex and only provides a solution for the tower assembly, not the windmill blades, which apparently must be mounted manually.

U.S. Publication No. 2011/0042958 A1 describes a collapsible wind turbine for ease of maintenance and transportation; however, the blades of the turbine remain exposed to the environment when the turbine is in the collapsed configuration, with each blade still presenting a large frontal area that would catch the wind and make moving the collapsed turbine more difficult. Furthermore, the turbine blades remain visible when not in use, and may still be considered an eye-sore or an otherwise unwanted view.

A long-felt need for portable power generation utilizing one or more renewable energy sources is further illustrated by U.S. Pat. No. 6,246,125 by Axtell, U.S. Pat. No. 7,105, 940 by Weesner et al., U.S. Pat. No. 7,821,147 by Du Bois, and U.S. Patent Application Pub. No. 2019/0061885 A1, for example.

Renewable wind energy is important for energy independence ranging from the national scale down to the off-grid, individual sensor-scale devices. Vertical axis wind turbines (VATs), as opposed to horizontal axis turbines (HATs) as commonly seen in commercial wind farms, are appealing in that they do not have to be oriented into the wind. VATs are seeing increasing use in domestic and road sign installations as well as on boats and RVs. However, unlike HATs whose pitch can be locked in high winds, VATs cannot be locked and have potential to become damaged in high winds. Furthermore, both VATs and HATs require assembly on-site because their design is optimized to capture wind and thus has a large blade area and structural volume that is mostly airspace.

SUMMARY OF THE INVENTION

An object of the present invention is to provide a collapsible and stowable generator that hides the generator when not in use. Such a device would not present an unwanted view when stowed and would not, when incorporated into an aerodynamic shroud, create a wind-obstacle during transportation.

Here is described a generator device with a stowable generating unit carried by collapsible support structure, enabling the stowage of the generating unit, protecting it from the environment, and providing a pleasing view when stowed.

This invention features a stowable generator device including a housing defining at least one storage chamber having an opening. A closure element is configured to selectively cover and uncover the opening. Support structure is disposed within the storage chamber in a collapsed position and is selectively extendable through the opening into an expanded position when the closure element is moved away from the opening. At least one energy generating unit is connected to the support structure. The support structure and the generating unit are configured to reversibly stow inside the housing in the collapsed position.

In some embodiments, the energy generating unit includes a wind turbine. In one embodiment, the housing is cylindrical. In certain embodiments, the closure element is pivotably connected to the housing and, in other embodiments, at least one closure element is connected to an upper portion of one of the support structures and is configured to seal its respective energy generating unit within the housing in the collapsed position and to travel with the support structure into the expanded position.

Such a collapsible generator can be more readily transported in a compact state and then quickly deployed when needed. Another application could be in sailboats, allowing for a larger device for more power generation when deployed, but capable of being stowed away when higher performance is required for sailing. In addition to having applicability in "terrestrial" and more consumer-facing markets, this concept could be a useful deployment mechanism for oceanographic sensors as well.

This invention may also be expressed as a stowable generator having support structure with arms and generator units that are capable of being stored or otherwise stowed in the housing, protecting those components from the environment and presenting an aerodynamic form for transportation. In some embodiments, the structure, arm, and generating unit are adjustable, moving out of the housing into an extended configuration suitable for harvesting an energy source. These components are then reversibly adjustable, moving back into the housing for storage in a stowed configuration.

BRIEF DESCRIPTION OF THE DRAWINGS

In what follows, preferred embodiments of the disclosure are explained in more detail with reference to the drawings, in which.

DEFINITIONS

Figure 1A:
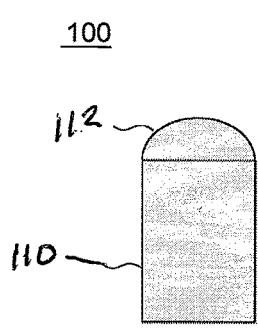
FIG. 1A is a schematic side view of a housing for a generator device according to the present invention in a stowed (collapsed) and closed configuration.
Figure 1B:
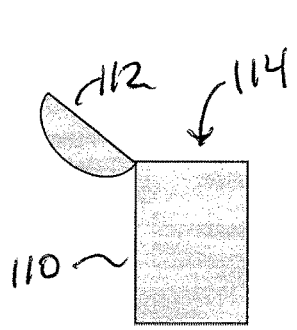
FIG. 1B is a view similar to FIG. 1A showing the device in a stowed and open configuration where the device's lid (closure element) is open.

The term "generating unit" as used herein refers to components of a given embodiment enabling the capture of a renewable energy source; for example, a generating unit may be a solar panel, a turbine blade, or a propeller blade. Often multiple generator units are provided to collectively capture one type of energy, i.e., the wind. One embodiment may have more than one type of generating unit, for example the embodiment illustrated in FIGS. 1A-1E, having solar generating units and wind energy turbine blade generating units.

The term "portion" as utilized herein refers to a section or region of a component, without necessarily indicating any physical difference between two or more portions apart from location such as "upper portion" and "lower portion".

DETAILED DESCRIPTION

Overview

The present disclosure describes a generator device having a housing, a support structure typically including at least one arm, and an energy generating unit which may include a generator and/or an energy storage device such as a battery. The generator device may be accomplished in several ways with different embodiments. Device 100, FIGS. 1A-1E, has a housing 110 defining a storage compartment 114, a closure element 112 such as a pivoting lid, and a stowable structure 120 including arms 122a, 122b, 122c and generating units 126a, 126b, 126c such as wind turbine blades that fit within the storage compartment 114 of housing 110. Generating units 126a-c can collapse into and extend out of the housing 110, forming a collapsible and stowable device that is portable.

Figure 1C:
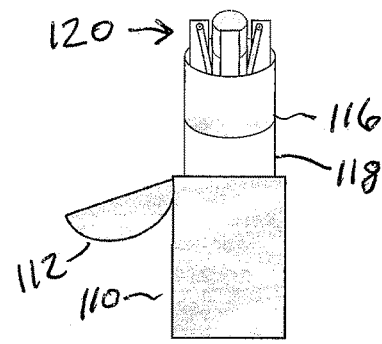
FIG. 1C is a view similar to FIGS. 1A-1B illustrating a first stage extension configuration, where an optional solar array has extended to an exposed condition while a wind turbine structure is not yet extended.

In a first stage extension configuration, FIG. 1C, an optional solar array 116 mounted on support cylinder 118 has extended into an exposed condition while the wind turbine structure 120 is not yet extended. In a second stage extension configuration, FIG. 1D, the wind turbine 120 is fully extended vertically but is still collapsed horizontally. In a third stage and fully extended configuration, FIG. 1E, the wind turbine 120 is fully extended both horizontally and vertically.

Devices according to the present invention are scalable to practically any sized generating device, from small, less than a foot-tall generator, to full-sized generators as commonly known. The device may be installed on practically any object or ground, including but not limited to boats, floating objects, land, houses, buildings, and the like. The device size typically enables easy transportation when in a stowed configuration (i.e., stowed in the housing). The device is capable of easy stowage and deployment, removing the need for intensive manual assembly once the device is in the desired location for power generation. In some embodiments, the device is autonomous, completely removing any manual assembly or disassembly.

Figure 2A:
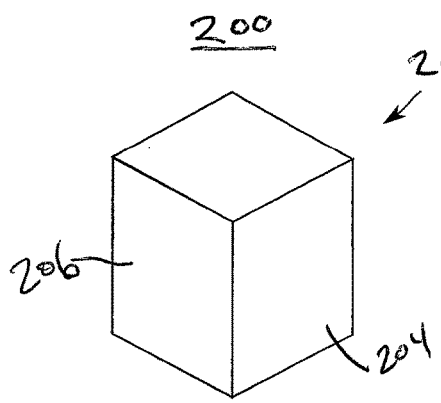
FIGS. 2A and 2B are two schematic perspective views of an embodiment having an adjustable housing to selectively expose solar generating units.
Figure 2B:
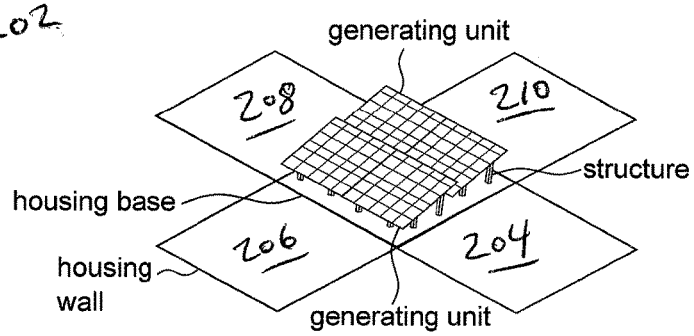

In another construction, and as illustrated in FIGS. 2A and 2B, a generator device 200 includes a housing 202 with fold-down walls 204, 206, 208 and 210 that exposes a support structure and generating units such as solar panels. In some of these embodiments, the structure, arms, and generating units may further articulate away from the housing. Preferably, in most embodiments, a generator is contained within the housing.

Housing

The present disclosure provides for a housing to shroud the generating units. According to the intended application, the housing may provide one or more of the following benefits: protecting the generating units from the external environment (e.g., when located in or during periods of harsh conditions), obscuring the generating units from view, and providing an aerodynamic surface to reduce drag on the generating units. The housing may be any suitable solution as known in the art. In the currently preferred embodiment, the housing is constructed of metal and is approximately cylindrical in shape.

Configurations. Preferably, the housing has at least two configurations, an open configuration and a closed configuration. A housing in the closed configuration is illustrated in FIG. 1A, enabling the housing to cover and protect the remainder of the generator device (i.e., structure, arms, and generating units). A housing in an open configuration is illustrated in FIGS. 1B-1E, where the housing has an adjustable lid that moves to change the housing's configuration; here the open configuration enables the structure to adjust out of the housing. Another example of the closed configuration is illustrated in FIG. 2A and another example of the open configuration is illustrated in FIG. 2B; here the housing walls are adjustable and provide the mechanism to change between configurations. It is to be understood that the embodiment and housing configuration shown in FIG. 2A is given the benefits of the housing described herein above and the housing configuration shown in FIG. 2B is not given the benefits of the housing, but instead the benefits of the generating units described elsewhere herein.

It is within the scope of the present disclosure for the housing to have additional configurations, for example a storage configuration, and a maintenance configuration. It is within the scope of the present disclosure for the housing to accommodate more than one set of generating units, arms, and structure; for example, a shipping container as commonly known, may be used as a housing to hold multiple generating sub-assemblies, forming one device.

Structure

The present disclosure provides for a mechanical support solution, referred herein as the structure. The structure provides a physical structure to put the generating units into an optimal position. The structure may be any suitable solution as known in the art. In some embodiments, the structure is adjustable. In the currently preferred embodiment, as illustrated in FIGS. 1A-1E, the structure adjusts by telescope sections, moving portions of the structure up and out of the housing to place the housing is in one or more extended configuration. In other embodiments, as illustrated in FIGS. 2A and 2B, the structure is substantially fixed and does not adjust.

In embodiments with multiple types of generating units (e.g., solar and wind), the structure will connect to both, and preferably, may adjust individual generating units or groups of generating units separately, resulting in only a portion of generator units in an extended configuration (e.g., extending only wind generator units on a cloudy, windy day).

Generating Units

Figure 1D:
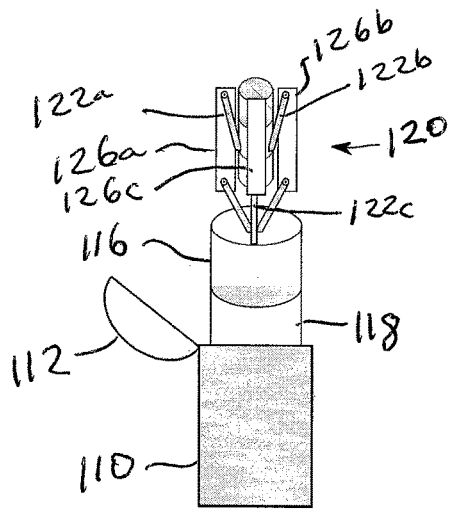
FIG. 1D illustrates a second stage extension configuration, where the wind turbine is fully extended vertically but is still collapsed horizontally.
Figure 1E:
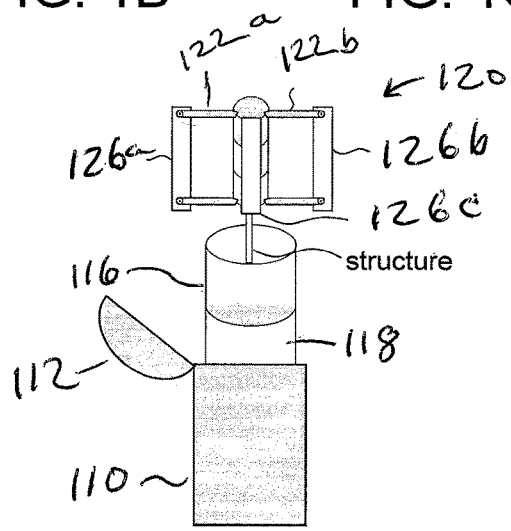
FIG. 1E illustrates a third stage and fully extended configuration, where the wind turbine is fully extended both horizontally and vertically.

The present disclosure provides for one or more generating units to produce electricity. The generating units may be any suitable solution as known in the art. Typically, an embodiment will have more than one generating unit. In embodiments with a turbine (either wind or hydroelectricity), each generating unit represents a turbine blade, as illustrated in FIGS. 1D and 1E. FIGS. 1C-1E also illustrate additional generating units comprising a solar array attached to the structure. FIG. 2B also illustrates a solar array having four generating units. Not pictured is an embodiment have generating units making up a hydropower water turbine.

In some embodiments, an adjustable arm connects the structure to a generating unit. Often the arms enable the components to fit inside the housing when stowed. For example, the embodiment shown in FIGS. 1A-1E has two arms per generating unit, each arm attaches to a point on the structure and a point on the generating unit. When the components are stowed or otherwise collapsed (FIGS. 1A-1D), the arm attachment points on the structure are lowered. For full deployment, the arms slide up along the structure, articulating the generating units out away from the structure where they may catch the wind to generate electricity.

Figure 3A:
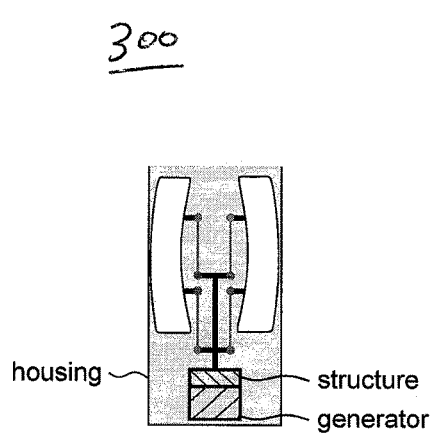
FIGS. 3A and 3B are two schematic partial cross-sectional views of one embodiment with adjustable arms and structure, enabling a reversibly stowable generator device.
Figure 3B:
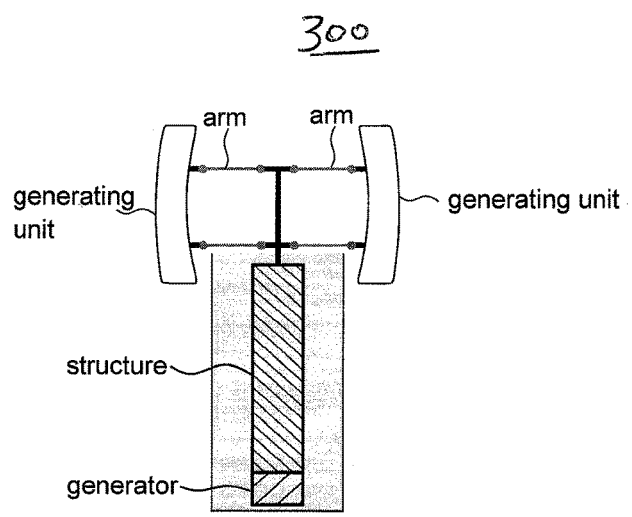

Generator device 300, FIGS. 3A and 3B, has support arms that pivot at a pivot point, typically pivoting 90 degrees from vertical in the stowed position (FIG. 3A) to horizontal in the open position (FIG. 3B), again enabling the generating units to become exposed to the external environment and produce electricity by harnessing a renewable energy source (e.g., the sun or the wind).

The arms may move or adjust to change configurations by any solution as known in the art. In the one embodiment, the arms pivot downward from the force of gravity, enabling the generating units move away from the structure when not constrained by the housing. In another embodiment, centrifugal forces provided by the wind or water cause the generating units to move the arms into an extended configuration. In some embodiments, an actuator is provided to change the arms between stowed and extended configurations. The actuator may be any suitable solution as known in the art and may also be connected to and provide the motive force to adjust the structure.

Generator

A generator is often included in the device to convert the potential energy of the generating units into electricity. The generator may be any suitable solution as known in the art. In rotating embodiments (i.e. wind and hydro power) the generator is connected to the generating units by a shaft and often by a gearbox as commonly known. Typically, the generator is located within the housing (as illustrated in FIGS. 3A and 3B). The shaft and gearbox, if present, is typically located within, or is supported by, the structure. It is within the scope of the present disclosure for the generator to be located separately from the housing, or to exit the housing when the device is in one or both of the open configuration or an extended configuration. When a plurality of generating units are provided, each unit has its own generator in some constructions and, in other constructions, two or more generating units are mechanically and/or electrically connected to a single generator.

Figure 4:
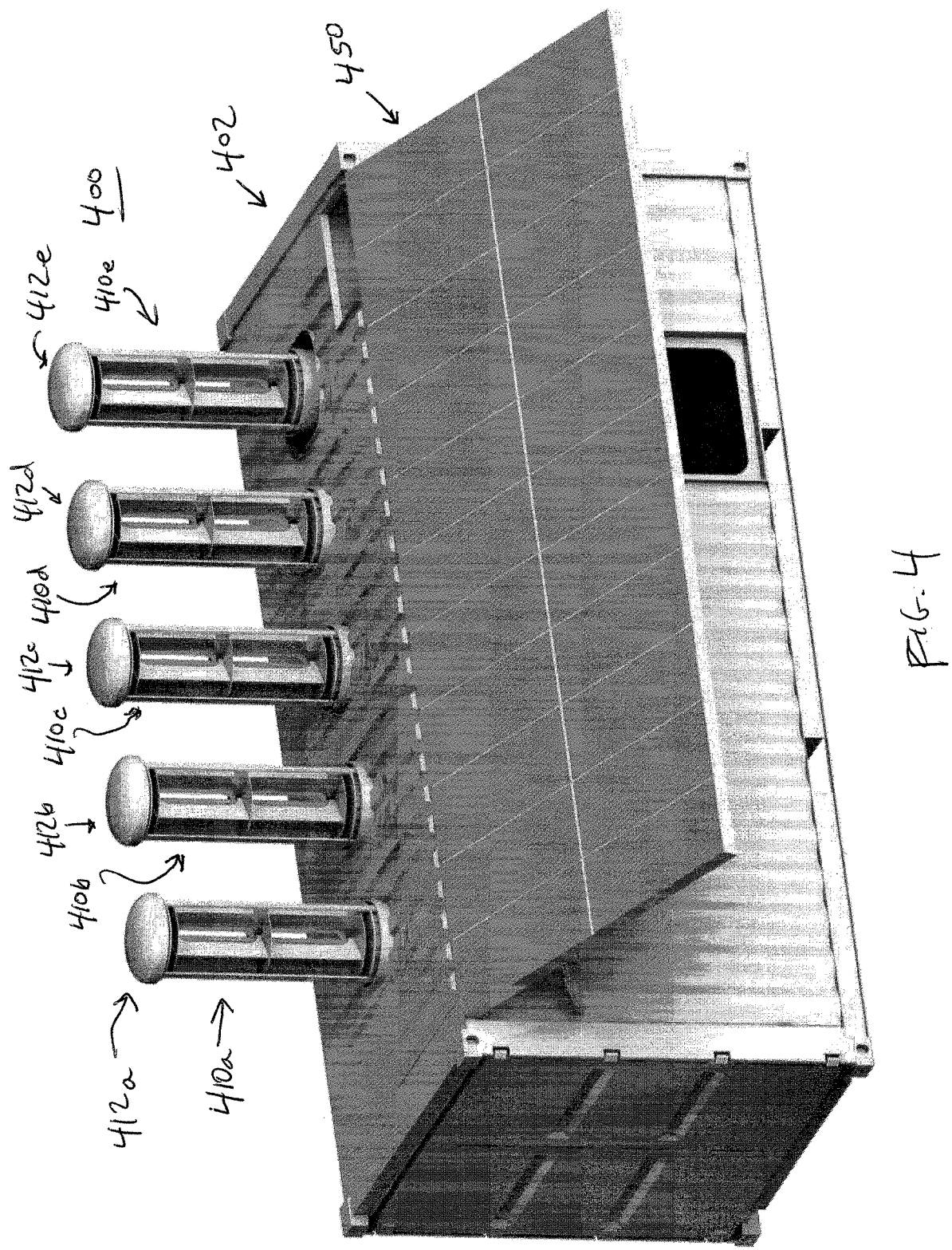
FIG. 4 is a schematic perspective view of a storage container housing with a plurality of wind turbines in an extended position plus a deployed solar panel array to serve as a modular power station according to the present invention.

FIG. 4 shows a combined wind and solar power station 400 including storage container housing 402 with a plurality of wind turbines 410a-410e in an extended position plus a deployed solar panel array 450 to serve as a modular power station according to the present invention. At least one closure element 412a-412e is connected to an upper portion of each respective support structure for each of the wind turbines 410a-410e and is configured to seal its respective energy generating unit 410a-410e within the housing 402 in the collapsed position and to travel with the support structure into the expanded position. Housing 402, such as a 20-foot shipping container or a 40-foot shipping container, defines a storage chamber for each of the wind turbines 410a-410e; in some constructions, individual compartments are provided as separate storage chambers and, in other constructions, a single open volume provides a plurality of storage chambers wherein each generating unit simply occupies interior space as needed.

Power station 400 is an example of integrated and distributed energy solutions according to the present invention to provide resilient renewable power generation where needed. Power station 400 transitions between a protected, shippable configuration and a deployed power generating configuration and can be integrated into buildings, towers and existing infrastructure.

Although specific features of the present disclosure are shown in some drawings and not in others, this is for convenience only, as each feature may be combined with any or all of the other features in accordance with the disclosure. While there have been shown, described, and pointed out fundamental novel features of the disclosure as applied to a preferred embodiment thereof, it will be understood that various omissions, substitutions, and changes in the form and details of the devices illustrated, and in their operation, may be made by those skilled in the art without departing from the spirit and scope of the disclosure. For example, it is expressly intended that all combinations of those elements and/or steps that perform substantially the same function, in substantially the same way, to achieve the same results be within the scope of the disclosure. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

What is claimed is:

1. A stowable generator system positionable into an external environment, comprising:
- a housing defining at least first and second storage chambers, each storage chamber having an opening and a closure element that is configured to selectively cover and uncover the opening;
- support structure disposed within each storage chamber in a collapsed position and selectively extendable through the respective opening into an expanded position when the closure element is moved away from the opening;
- an energy generating unit connected to each support structure;
- wherein each support structure and its respective generating unit are configured to reversibly stow inside the housing in the collapsed position; and
- wherein at least one closure element is connected to an upper portion of one of the support structures and is configured to seal its respective energy generating unit within the housing in the collapsed position and to travel with the support structure into the expanded position.

2. The system of claim 1 wherein at least one energy generating unit includes a wind turbine.

* * * * *